United States Patent
Li et al.

(10) Patent No.: US 9,632,631 B2
(45) Date of Patent: Apr. 25, 2017

(54) SIGNAL DETECTING METHOD OF TOUCH PANEL, TOUCH PANEL AND DISPLAY DEVICE

(71) Applicants: Shanghai AVIC Optoelectronics Co., Ltd., Shanghai (CN); Tianma Micro-Electronics Co., Ltd., Shenzhen (CN)

(72) Inventors: Li Li, Shanghai (CN); Xupeng Wang, Shanghai (CN); Xiangchun Wang, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 44 days.

(21) Appl. No.: 14/285,552

(22) Filed: May 22, 2014

(65) Prior Publication Data
US 2015/0177875 A1 Jun. 25, 2015

(30) Foreign Application Priority Data

Dec. 23, 2013 (CN) .......................... 2013 1 0719288

(51) Int. Cl.
*G06F 3/044* (2006.01)
*G09G 5/00* (2006.01)
*G06F 3/041* (2006.01)

(52) U.S. Cl.
CPC ............ *G06F 3/044* (2013.01); *G06F 3/0416* (2013.01); *G09G 5/006* (2013.01); *G09G 2300/0426* (2013.01)

(58) Field of Classification Search
CPC .................. G06F 3/0416; G06F 3/044; G09G 2300/0426; G09G 5/006
See application file for complete search history.

(56) References Cited

U.S. PATENT DOCUMENTS

| 2011/0175823 A1* | 7/2011 | Vieta | ..................... G06F 3/0412 |
| | | | 345/173 |
| 2012/0206407 A1* | 8/2012 | Taylor | ..................... G06F 3/044 |
| | | | 345/174 |

(Continued)

FOREIGN PATENT DOCUMENTS

| CN | 102033637 A | 4/2011 |
| KR | 20130046283 A | 5/2013 |

*Primary Examiner* — Latanya Bibbins
(74) *Attorney, Agent, or Firm* — Alston & Bird LLP (57) ABSTRACT

A signal detecting method for a touch panel, a touch panel, and a display device are disclosed. The touch panel includes: several driving lines, several sensing lines, several driving electrodes, and several sensing electrodes; and also includes: a driving module configured to provide driving signals to the respective driving electrodes to drive the respective driving electrodes; a first detection module configured to detect a first signal representing a capacitance between a particular driven driving electrode and each of the sensing electrodes; a reusing module configured to, when one of the driving electrode is driven, reuse at least one driving electrode other than the driven driving electrode to additionally function as a sensing electrode; and a second detection module configured to detect a second signal representing a capacitance between the driven driving electrode and the at least one reused driving electrode which additionally functions as a sensing electrode.

11 Claims, 9 Drawing Sheets

(56) References Cited

U.S. PATENT DOCUMENTS

2013/0133927 A1\* 5/2013 Gradl ................... G06F 3/044
                                                                                                174/250
2015/0049044 A1\* 2/2015 Yousefpor ............... G06F 3/044
                                                                                                345/174

\* cited by examiner

SIGNAL DETECTING METHOD OF TOUCH PANEL, TOUCH PANEL AND DISPLAY DEVICE

CROSS-REFERENCES TO RELATED APPLICATIONS

This application claims the benefit of priority to Chinese Patent Application No. 201310719288.3, filed with the Chinese Patent Office on Dec. 23, 2013 and entitled "SIGNAL DETECTING METHOD OF TOUCH PANEL, TOUCH PANEL AND DISPLAY DEVICE", the content of which is incorporated herein by reference in its entirety.

TECHNICAL FIELD

The present invention relates to the field of touch panel technologies, and in particularly to a signal detecting method of a touch panel, a touch panel and a display device.

BACKGROUND OF THE INVENTION

A mutual capacitive touch panel has been widely used as a human-computer interaction device due to its advantages of direct, precise, efficient and smooth operations.

In the mutual capacitive touch panel, a number of driving electrodes and a number of sensing electrodes, both formed by Indium Tin Oxides (ITO), are disposed on a glass, and a mutual capacitor is formed at an intersection between a driving electrode and a sensing electrode, with the driving electrode and the sensing electrode functioning as two plates of the capacitor. When driving signals are sent to the driving electrodes sequentially, the sensing electrodes receive sensing signals, so that a capacitance value at each of intersections between all the driving electrodes and all the sensing electrodes is obtained. When the mutual capacitive touch panel is touched by a user's finger, a signal relevant to the coupling capacitance between two electrodes (one of which is a driving electrode and the other is a sensing electrode) around each touch point is changed, so that coordinates of the touch point can be calculated according to the change of the signal.

Currently, the driving electrodes and the sensing electrodes of a mutual capacitive touch panel are distributed by either a first way or a second way below.

Figure 1:
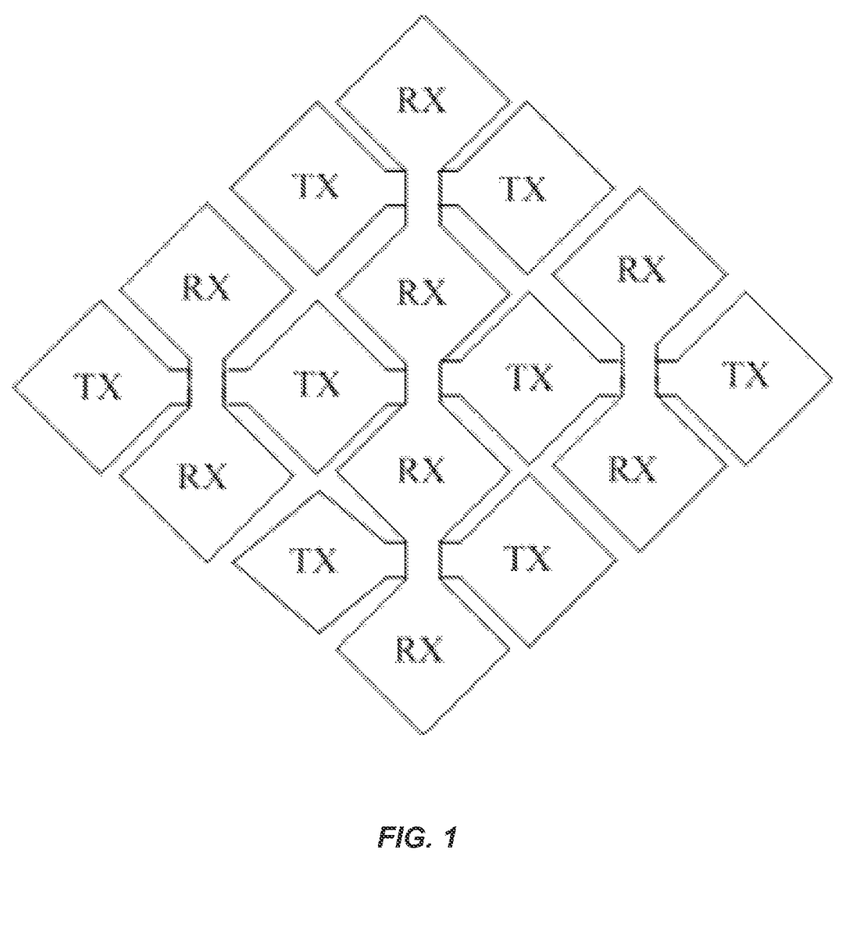
FIG. 1 is a schematic view showing a structure of driving electrodes and sensing electrodes in the prior art.

The first way is such that driving electrodes in a same row are connected by bridges and so do sensing electrodes in a same column, as illustrated in FIG. 1, where the driving electrodes are denoted by TX and the sensing electrodes are denoted by RX.

Figure 2:
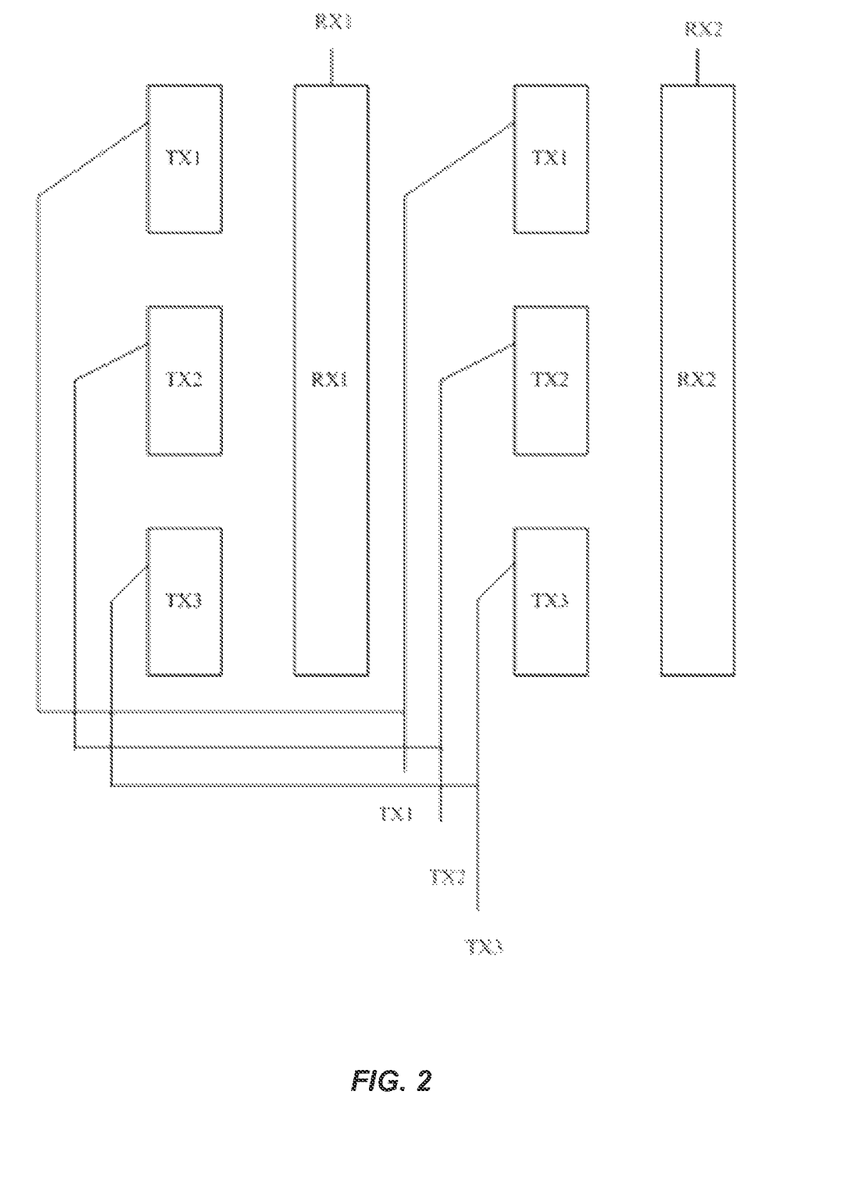
FIG. 2 is a schematic view showing a structure of driving electrodes and sensing electrodes in the prior art.

The second way is such that driving electrodes are electrically connected by outside circuits and so do sensing electrodes, as illustrated in FIG. 2, where the driving electrodes are denoted by TX1, TX2 and TX3, and the sensing electrode are denoted by RX1 and RX2.

BRIEF SUMMARY OF THE INVENTION

One inventive aspect is a signal detecting method for a touch panel, where the touch panel includes a plurality of driving lines, a plurality of sensing lines, a plurality of driving electrodes electrically connected to the plurality of driving lines, and a plurality of sensing electrodes electrically connected to the plurality of sensing lines. The method includes sequentially sending driving signals to the respective driving electrodes via the driving lines to drive the respective driving electrodes, detecting a first signal representing a capacitance between a particular driven driving electrode and each of the sensing electrodes, when one of the driving electrodes is driven, reusing at least one driving electrode other than the driven driving electrode to additionally function as a sensing electrode and detecting a second signal representing a capacitance between the driven driving electrode and the at least one reused driving electrode which additionally functions as a sensing electrode.

Another inventive aspect is a capacitive touch panel. The touch panel includes a plurality of driving lines, a plurality of sensing lines, a plurality of driving electrodes electrically connected to the plurality of driving lines, and a plurality of sensing electrodes electrically connected to the plurality of sensing lines. The touch panel also includes: a driving module configured to provide driving signals which are sent via the driving lines sequentially to the respective driving electrodes to drive the respective driving electrodes; a first detection module configured to detect a first signal representing a capacitance between a particular driven driving electrode and each of the sensing electrodes; a reusing module configured to, when one of the driving electrode is driven, reuse at least one driving electrode other than the driven driving electrode to additionally function as a sensing electrode; and a second detection module configured to detect a second signal representing a capacitance between the driven driving electrode and the at least one reused driving electrode which additionally functions as a sensing electrode.

Another inventive aspect is a display device, including a touch panel. The touch panel includes a plurality of driving lines, a plurality of sensing lines, a plurality of driving electrodes electrically connected to the plurality of driving lines, and a plurality of sensing electrodes electrically connected to the plurality of sensing lines. The touch panel also includes: a driving module configured to provide driving signals which are sent via the driving lines sequentially to the respective driving electrodes to drive the respective driving electrodes; a first detection module configured to detect a first signal representing a capacitance between a particular driven driving electrode and each of the sensing electrodes; a reusing module configured to, when one of the driving electrode is driven, reuse at least one driving electrode other than the driven driving electrode to additionally function as a sensing electrode; and a second detection module configured to detect a second signal representing a capacitance between the driven driving electrode and the at least one reused driving electrode which additionally functions as a sensing electrode.

BRIEF DESCRIPTION OF THE DRAWINGS

The accompanying drawings used for the description of embodiments of the present invention or the prior art will be briefly described, to make the embodiments of the present invention or the prior art more apparent. The accompanying drawings described below illustrate merely some embodiments of the present invention, and other drawings may be derived from the accompanying drawings by the skilled person in the art without creative work.

DETAILED DESCRIPTION OF THE PREFERRED EMBODIMENTS

The technical solution in the present disclosure will be described below clearly and completely in combination with the drawings and embodiments of the present invention. Apparently, the below-described embodiments form only a part but not all of embodiments of the present invention. Other embodiments obtained by the skilled person in the art based on the embodiments of the present invention without creative work fall within the scope of the present invention.

Figure 3:
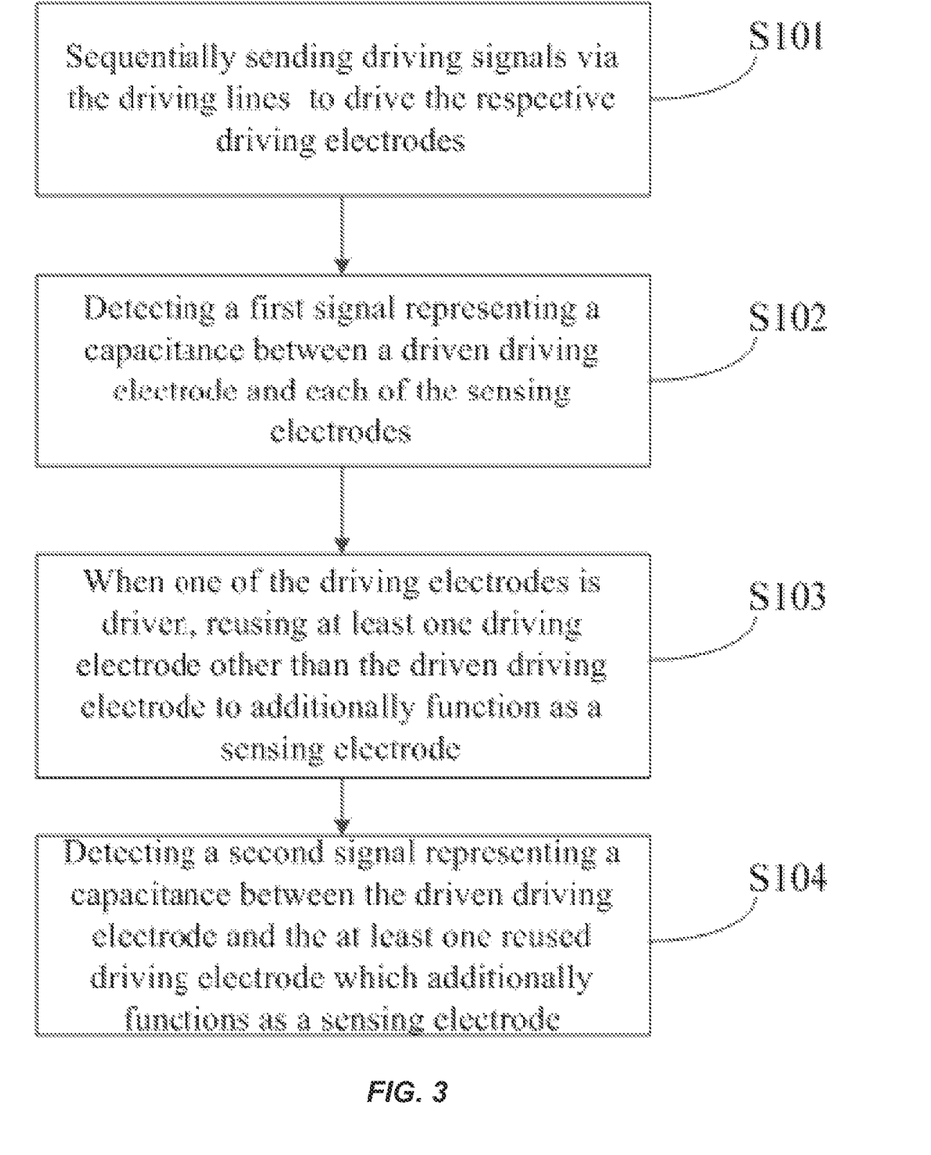
FIG. 3 is a schematic flowchart for a signal detecting method of a touch panel according to an embodiment of the invention.

FIG. 3 is a schematic flowchart for a signal detecting method of a touch panel according to an embodiment of the invention. Herein, driving electrodes and sensing electrodes can be made of ITO, for example. A plurality of driving lines, a plurality of sensing lines, a plurality of driving electrodes electrically connected to the plurality of driving lines, and a plurality of sensing electrodes electrically connected to the plurality of sensing lines are disposed in the touch panel, based on which, a signal detecting method of a touch panel is disclosed in an embodiment of the present invention. As illustrated in FIG. 3, the method according to an embodiment of the invention includes Steps S101, S102, S103, and S104 described below.

At Step S101, driving signals are sent sequentially via driving lines to drive the respective driving electrodes; preferably, the driving signals are sent sequentially via the driving lines under the control of an integrated circuit (IC).

At Step S102, a first signal representing a capacitance between a driven driving electrode and each of the sensing electrodes is detected.

At step S102, if a variation of the detected first signal representing the capacitance between the driven driving electrode and each of the sensing electrodes exceeds a preset range, it is determined that the touch panel is being touched; on the contrary, if the variation of the detected first signal representing the capacitance is within the preset range, it is determined that the touch panel is not touched. Preferably, the signal of the coupling capacitance may be detected by an IC.

At Step S103, when a driving electrode is driven, at least one driving electrode other than the driven driving electrode is reused to additionally function as a sensing electrode, preferably through an IC.

Figure 4A:
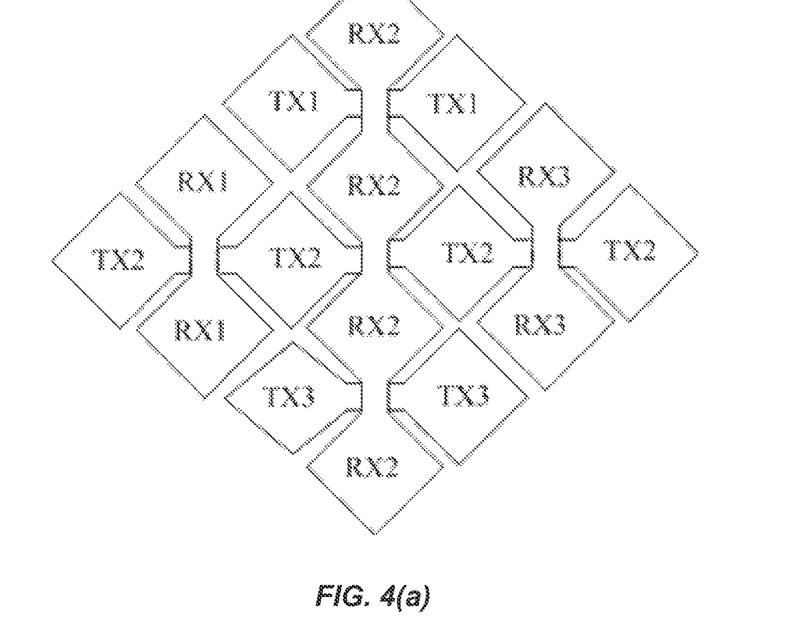
FIG. 4(a) is a schematic view showing a structure of driving electrodes and sensing electrodes before at least one driving electrode other than the driven driving electrodes additionally functions as a sensing electrode according to an embodiment of the invention.
Figure 4B:
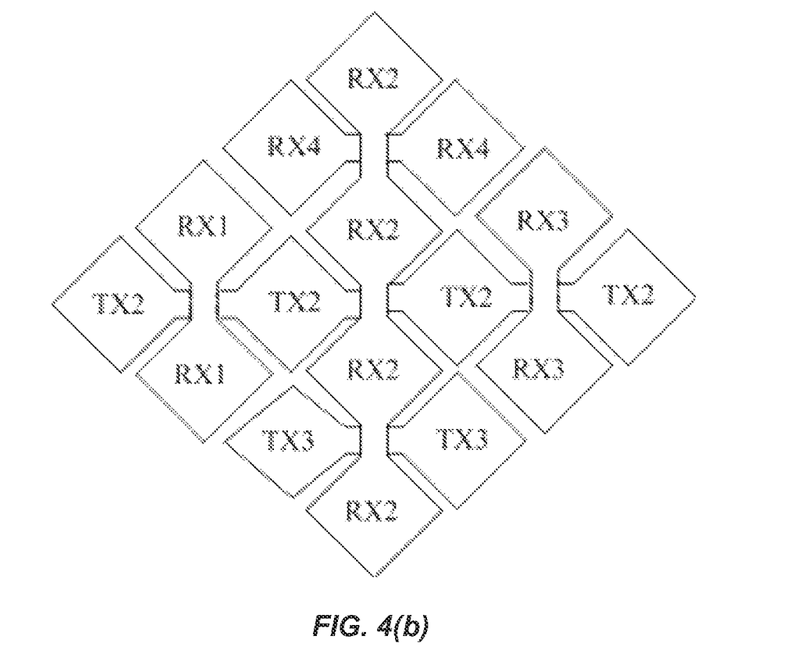
FIG. 4(b) is a schematic view showing a structure of driving electrodes and sensing electrodes after at least one driving electrode other than the driven driving electrodes additionally functions as a sensing electrode according to an embodiment of the invention.

At step S103, when a driving electrode is driven, at least one driving electrode other than the driven driving electrode can be reused to additionally function as a sensing electrode. FIG. 4(a) is a schematic view showing a structure of driving electrodes and sensing electrodes before at least one driving electrode other than the driven driving electrode is reused to additionally function as a sensing electrode, where TX1, TX2 and TX3 represent driving electrodes, and RX1, RX2 and RX3 represent sensing electrodes. FIG. 4(b) is a schematic view showing a structure of driving electrodes and sensing electrodes after the at least one driving electrode other than the driven driving electrode is reused to additionally function as a sensing electrode, where TX2 and TX3 still represent driving electrodes, RX1, RX2 and RX3 represent sensing electrodes, and RX4 in FIG. 4 (b) represents a sensing electrode generated by reusing a driving electrode TX1 in FIG. 4(a). It should be noted that, although only one driving electrode is reused to additionally function as a sensing electrode, more driving electrodes may be reused to function as sensing electrodes as actually desired.

At Step S104, a second signal representing a capacitance between the driven driving electrode and the at least one reused driving electrode which additionally functions as a sensing electrode is detected.

It should be noted that FIGS. 4(a) and 4(b) are described based on the structure illustrated in FIG. 1 for ease of describing the method in the present embodiment, but the signal detecting method of a touch panel disclosed by the present embodiment is not limited thereto. That is, the method disclosed by the present embodiment is also suitable for the structure illustrated in FIG. 2. More generally, it should be understood by the skilled person in the art that the method disclosed by the present embodiment is suitable for any other structures of driving electrodes and sensing electrodes.

In the prior art, when the touch point is between adjacent driving electrodes, a variation of the signal representing the capacitance between these adjacent driving electrodes cannot be detected, thus a region between two adjacent driving electrodes is a blind spot for a mutual capacitive touch panel, and a touch point in this region cannot be positioned. Therefore, some touch points might be missed in the process of locating touch points, which leads to a low accuracy for touch point locating.

Through the signal detecting method of a touch panel as disclosed by the present embodiment, a variation of the signal representing the capacitance between a driven driving electrode and at least one driving electrode other than the driven driving electrode can be detected, therefore a touch point in the region between adjacent driving electrodes can be positioned, and any touch point will not be missed in the process of touch point locating, so that the accuracy for the touch point locating is improved.

Figure 5:
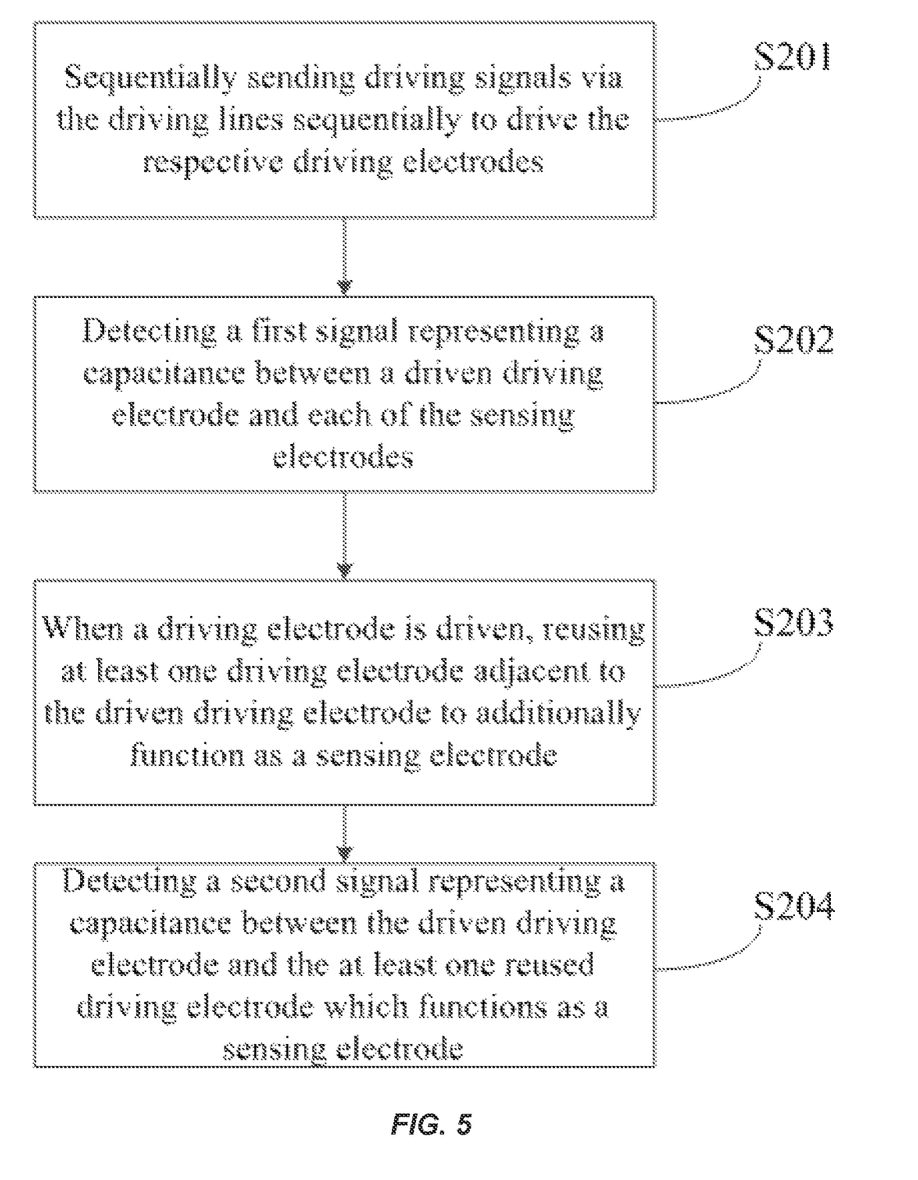
FIG. 5 is a schematic flowchart for a signal detecting method of a touch panel according to an embodiment of the invention.

FIG. 5 is a schematic flowchart for a signal detecting method of a touch panel according to an embodiment of the invention. As illustrated in FIG. 5, the signal detecting method of a touch panel according to the embodiment of the invention includes Steps S201, S202, S203, and S204 described below.

At Step S201, driving signals are sent sequentially via the driving lines to drive the respective driving electrodes.

At Step S202, a first signal representing a capacitance between a driven driving electrode and each of the sensing electrodes is detected.

The implementation of steps S201 to S202 is the same as that of steps S101-S102 in the signal detecting method of a touch panel according to the previous embodiment, and thus will not be repeatedly described.

At Step S203, when a driving electrode is driven, at least one driving electrode adjacent to the driven driving electrode is reused to additionally function as a sensing electrode.

Figure 6A:
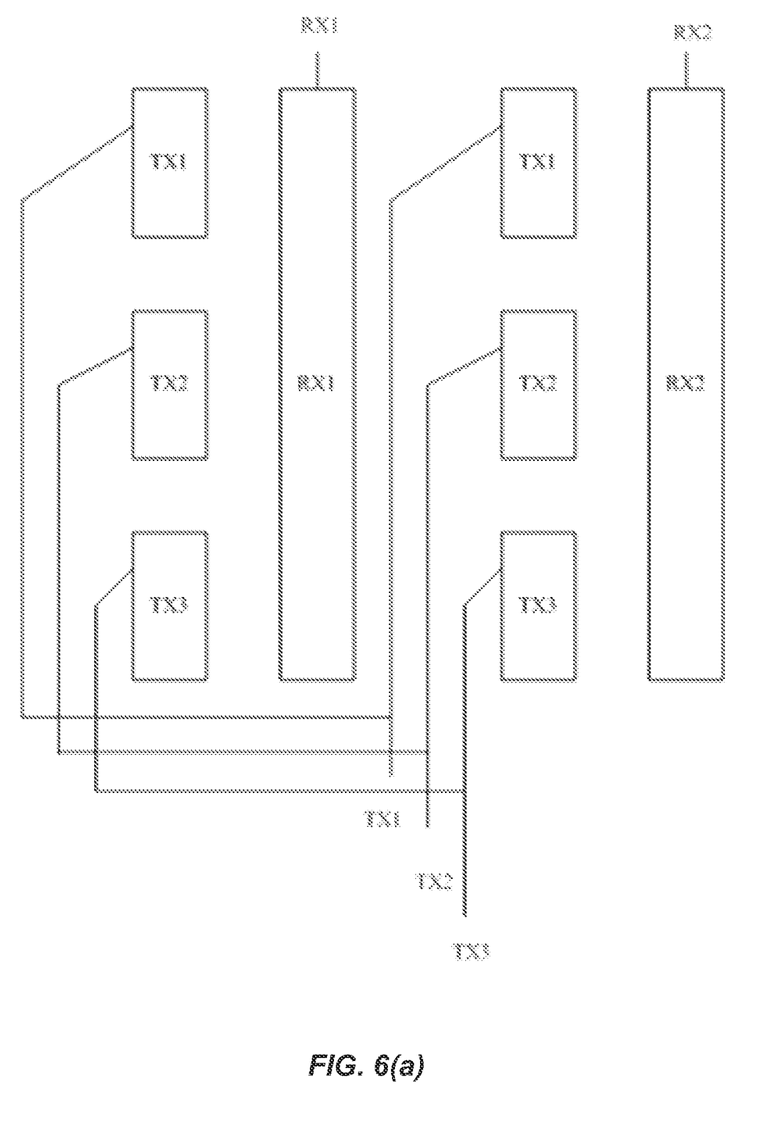
FIG. 6(a) is a schematic view showing a structure of driving electrodes and sensing electrodes before at least one driving electrode adjacent to the driven driving electrodes additionally functions as a sensing electrode according to an embodiment of the invention.
Figure 6B:
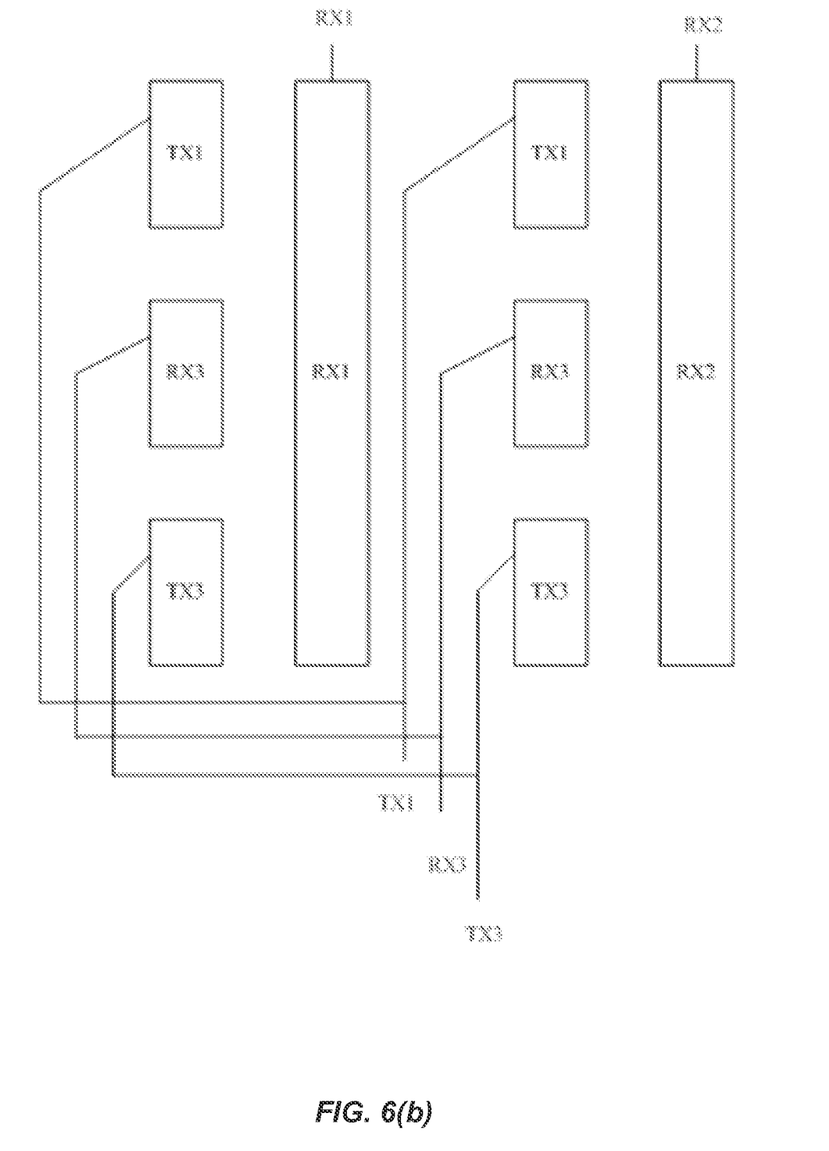
FIG. 6(b) is a schematic view showing a structure of driving electrodes and sensing electrodes after at least one driving electrode adjacent to the driven driving electrodes additionally functions as a sensing electrode according to an embodiment of the invention.

At step S203, when a driving electrode is driven, at least one driving electrode other than the driven driving electrode, which may be adjacent to the driven driving electrode, may be reused to additionally function as a sensing electrode. FIG. 6(a) is a schematic view showing a structure of driving electrodes and sensing electrodes before at least one driving electrode adjacent to the driven driving electrode is reused to additionally function as a sensing electrode, where TX1, TX2 and TX3 represent driving electrodes, and RX1 and RX2 represent sensing electrodes. FIG. 6(b) is a schematic view showing a structure of driving electrodes and sensing electrodes after the at least one driving electrode adjacent to the driven driving electrode is reused to additionally function as a sensing electrode, where TX1 and TX3 represent driving electrodes, and RX1, RX2 and RX3 represent sensing electrodes.

At Step S204, a second signal representing a capacitance between the driven driving electrode and the at least one reused driving electrode which functions as a sensing electrode is detected.

It should be noted that FIG. 6(a) and FIG. 6(b) are described based on the structure illustrated in FIG. 2 for ease of describing the method in the present embodiment, but the signal detecting method of a touch panel disclosed by the present embodiment is not limited thereto. That is, the method disclosed by the present embodiment is also suitable for the structure illustrated in FIG. 1. More generally, it should be understood by the skilled person in the art that the method disclosed by the present embodiment is suitable for any other structures of driving electrodes and sensing electrodes.

Through the signal detecting method of a touch panel as disclosed by the present embodiment, a variation of the signal representing the capacitance between a driven driving electrode and at least one driving electrode adjacent to the driven driving electrode can be detected, therefore a touch point in the region between adjacent driving electrodes can be positioned, and any touch point will not be missed in the process of touch point locating, so that the accuracy for the touch point locating is improved.

In the prior art, driving lines and sensing lines are always maintained in an active state in a process of positioning a touch point on a touch panel, thus the driving lines and the sensing lines influence each other, and significant noise is generated. To further address the above problems, at least an un-driven driving electrode which is not reused to additionally function as a sensing electrode can be grounded.

After being grounded, any one un-driven driving electrode which is not reused to additionally function as a sensing electrode is in a standby state. Despite that the driving lines and the sensing lines which are in an active state may influence each other so that significant noise is generated, the driving lines and the sensing lines which are correspondingly in the standby state will not influence each other, which reduces the noise in operations. Therefore, the variation of the signal representing the capacitance between a driven driving electrode and at least one driving electrode other than the driven driving electrode can be detected, to locate a touch point in a region between a driving electrode TX and an adjacent driving electrode TX, so that any touch point will not be missed in the process of touch point locating, thus the accuracy for the touch point locating is improved; furthermore, at least an un-driven driving electrode which is not reused to additionally function as a sensing electrode is grounded, and at least a driving line connected to the grounded driving electrode stops driving corresponding driving electrode, so that the influence between driving lines and sensing lines may be avoided, which reduces the noise.

Figure 7:
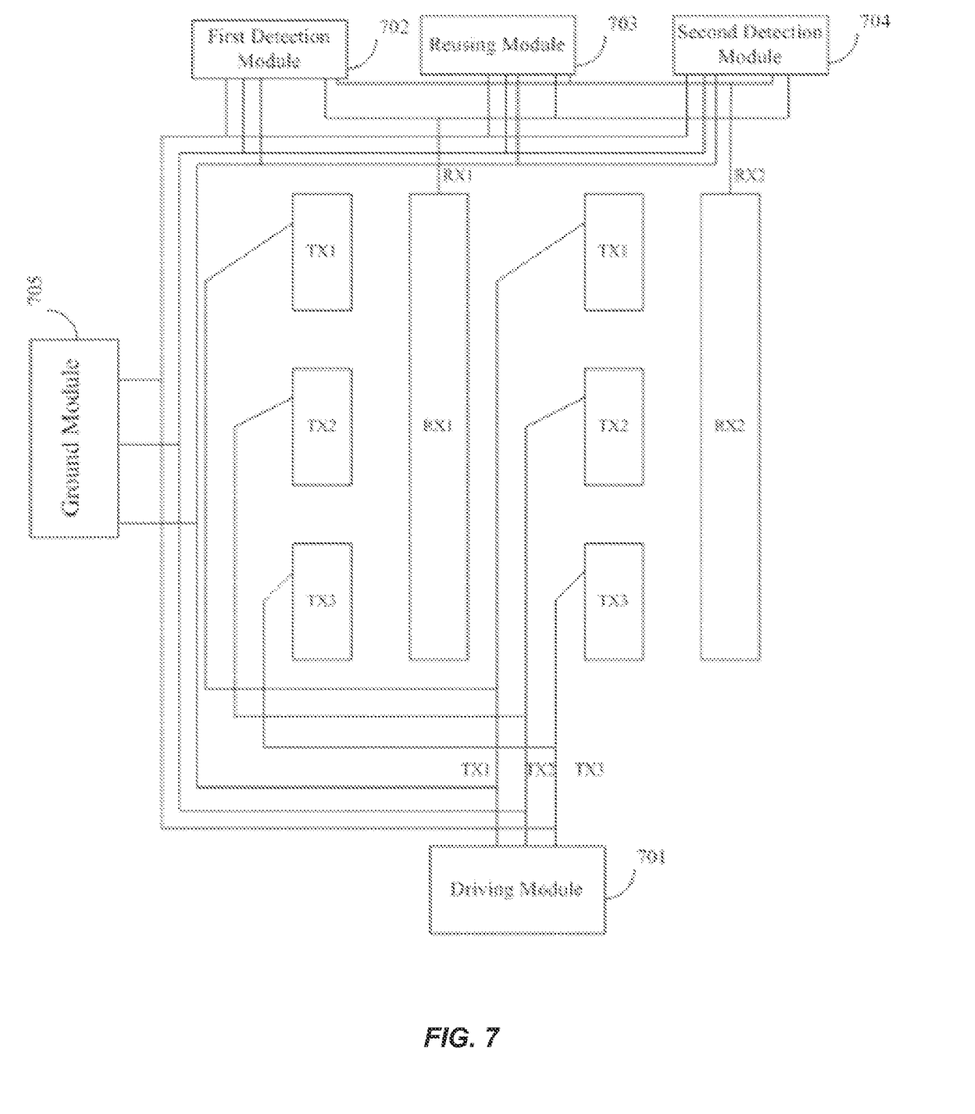
FIG. 7 is a schematic view showing a structure of a touch panel according to an embodiment of the invention.

As illustrated in FIG. 7 which is a schematic view showing a structure of a touch panel according to an embodiment of the invention, an embodiment of the present invention discloses a capacitive touch panel, which includes a plurality of driving lines, a plurality of sensing lines, a plurality of driving electrodes electrically connected to the plurality of driving lines, and a plurality of sensing electrodes electrically connected to the plurality of sensing lines. The capacitive touch panel further includes: a driving module 701, a first detection module 702, a reusing module 703 and a second detection module 704. In practice, the driving module, the first detection module, the reusing module and the second detection module may correspond to functional units in an IC, or have respective functions corresponding to functions of an IC.

The driving module 701 is configured to provide driving signals which are sequentially sent via the driving lines to drive the respective driving electrodes; preferably, the driving signals are sent via the driving lines sequentially under the control of an IC.

The first detection module 702 is configured to detect a first signal representing a capacitance between the driven driving electrode and each sensing electrode.

In the first detection module 702, the first signal representing the capacitance between the driven driving electrode and each sensing electrode is detected from each sensing electrode. Preferably, the signal of coupling capacitance is detected through an IC.

The reusing module 703 is configured to, when a driving electrode is driven, reuse at least one driving electrode other than the driven driving electrode to additionally function as a sensing electrode, preferably under the control of an IC.

Further preferably, the reusing module 703 is further configured to, when a driving electrode is driven, reuse at least one driving electrode which is adjacent to the driven driving electrode to additionally function as a sensing electrode. It should be noted that this is just a preferable solution disclosed by the embodiment of the present invention, and is not intended to limit the device disclosed by the embodiment of the present invention.

The second detection module 704 is configured to detect a second signal representing a capacitance between the driven driving electrode and the at least a reused driving electrode which additionally functions as a sensing electrode.

With the capacitive touch panel disclosed by the present embodiment, a variation of the signal representing the capacitance between a driving electrode TX and its adjacent driving electrode TX can be detected, therefore a touch point in a region between two adjacent driving electrodes TX can be positioned, and any touch point will not be missed in a process of touch point locating, so that the accuracy for a touch point locating is improved.

In the prior art, driving lines and sensing lines are always maintained in an active state in a process of positioning a touch point on a touch panel, thus the driving lines and the sensing lines influence each other, and significant noise is generated. To further address the above problems, in an embodiment of the invention, the capacitive touch panel can further include a ground module 705 configured to ground at least an un-driven driving electrode which is not reused to additionally function as a sensing electrode, as illustrated in FIG. 7.

When any one un-driven driving electrode which is not reused to additionally function as a sensing electrode is grounded, the IC stops sending a driving signal to a driving line connected to the grounded driving electrode, and also stops receiving any sensing signal from the grounded driving electrode.

Figure 8:
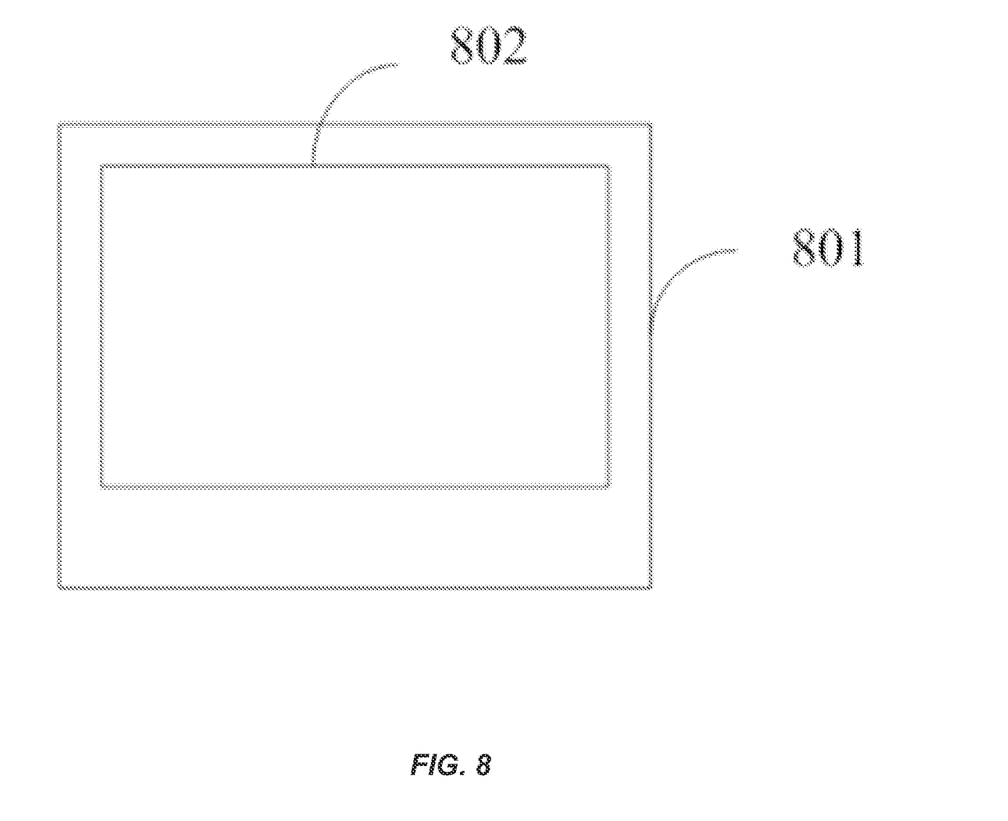
FIG. 8 is a schematic view showing a structure of a display device according to an embodiment of the invention.

A display device is further disclosed by an embodiment of the present invention, and the display device 801 includes a touch panel 802 disclosed by any one of the previous embodiments, as illustrated in FIG. 8. The display device 801 may be arranged in a mobile communication apparatus such as a cellphone and a tablet computer. The display device 801 may also be a liquid crystal display device, or an organic light emitting diode (OLED) display device, or other display devices.

The embodiments of the present invention can be described in a progressive and systemic manner, every embodiment focus on the differences between the embodiment and other embodiments, same or familiar parts between every embodiment can be referred to by each other. The method disclosed by the embodiments are described relative simply due to the method is corresponding to the system disclosed by the embodiments, relative parts can be referred to that in the system.

Previous embodiments are preferable embodiments, which do not limit the present invention. Instead, the present invention can be changed and modified by the skilled person in the art. Any changes, equivalent replacements and modifications within the scope and principle of the present invention fall within the scope of the present invention.

What is claimed is:

1. A signal detecting method for a touch panel, wherein the touch panel comprises a plurality of first electrodes arranged in n rows, and a plurality of second electrodes arranged in m columns, and wherein the method comprises:
   (A) sending a driving signal to the $i^{th}$ row of the first electrodes, wherein i=1 . . . n;
   (B) detecting a first signal Sii from each column of the second electrodes, wherein i=1 . . . m;
   (C) detecting a second signal from one row of the first electrodes excluding the $i^{th}$ row being driven;
   (D) repeating steps (A) to (C) to the $(i+1)^{th}$ row; and
   (E) determining a touch position based on the first signals and the second signals.

2. The signal detecting method of a touch panel according to claim 1, further comprising: when detecting a second signal from one row of first electrodes excluding the $i^{th}$ row being driven, grounding at least one row of the first electrodes, which excludes the $i^{th}$ row of first electrodes being driven and the another row of first electrodes being detected.

3. The signal detecting method of a touch panel according to claim 1, wherein detecting a second signal from another row of first electrodes excluding the $i^{th}$ row being driven comprises:
   detecting the second signal from a row of first electrodes adjacent to the $i^{th}$ row of first electrodes being driven.

4. The signal detecting method of a touch panel according to claim 1, wherein the step (B) and step (C) are simultaneously performed.

5. The signal detecting method of a touch panel according to claim 1, wherein in step (D), the touch position is determined only based on the first signals and the second signals.

6. A capacitive touch panel, comprising:
   a plurality of first electrodes arranged in n rows;
   a plurality of second electrodes arranged in m columns;
   a driving module configured to provide driving signals to the respective rows of the first electrodes;
   a first detection module configured to detecting a first signal Sii from each column of the second electrodes, wherein i=1 . . . m; and
   a second detection module configured to detect a second signal from one row of the first electrodes excluding the $i^{th}$ row being driven.

7. The touch panel according to claim 6, further comprising a ground module configured to, when detecting a second signal from one row of the first electrodes excluding the $i^{th}$ row being driven, ground at least one row which excludes the $i^{th}$ row being driven and another row being detected.

8. The touch panel according to claim 6, wherein the second detection module is configured to, detect a second signal representing a capacitance between the $i^{th}$ row being driven and a row adjacent to the row being driven.

9. A display device, comprising a touch panel, the touch panel comprising:
   a plurality of first electrodes arranged in n rows;
   a plurality of second electrodes arranged in m columns;
   a driving module configured to provide driving signals to the respective rows of the first electrodes;
   a first detection module configured to detecting a first signal Sii from each column of the second electrodes, wherein i=1 . . . m; and
   a second detection module configured to detect a second signal from another row of first electrodes excluding the $i^{th}$ row being driven.

10. The display device according to claim 9, wherein the touch panel further comprises a ground module configured to, when detecting a second signal from one row of first electrodes excluding the $i^{th}$ row being driven, ground at least one row which excludes the $i^{th}$ row being driven and at least one another row being detected.

11. The display device according to claim 9, wherein the second detection module is configured to, detect a second signal representing a capacitance between the row being driven and a row adjacent to the $i^{th}$ row being driven.

* * * * *